(12) United States Patent
Hird et al.

(10) Patent No.: US 11,379,588 B2
(45) Date of Patent: Jul. 5, 2022

(54) SYSTEM VALIDATION BY HARDWARE ROOT OF TRUST (HROT) DEVICE AND SYSTEM MANAGEMENT MODE (SMM)

(71) Applicant: Raytheon Company, Waltham, MA (US)

(72) Inventors: Trevor B. Hird, Austin, TX (US); Jody R. Coleman, Chapin, SC (US); Amiel DeVoursney, Lyman, SC (US)

(73) Assignee: Raytheon Company, Waltham, MA (US)

( * ) Notice: Subject to any disclaimer, the term of this patent is extended or adjusted under 35 U.S.C. 154(b) by 403 days.

(21) Appl. No.: 16/722,142

(22) Filed: Dec. 20, 2019

(65) Prior Publication Data
US 2021/0192050 A1 Jun. 24, 2021

(51) Int. Cl.
| | |
|---|---|
| *G06F 21/57* | (2013.01) |
| *G06F 9/44* | (2018.01) |
| *H04L 9/32* | (2006.01) |
| *G06F 9/445* | (2018.01) |
| *G06F 21/60* | (2013.01) |

(Continued)

(52) U.S. Cl.
CPC .......... *G06F 21/575* (2013.01); *G06F 9/4403* (2013.01); *G06F 9/44505* (2013.01); *G06F 21/572* (2013.01); *G06F 21/606* (2013.01); *H04L 9/3236* (2013.01); *G06F 8/61* (2013.01); *G06F 2221/033* (2013.01)

(58) Field of Classification Search
CPC .. G06F 21/575; G06F 9/44505; G06F 21/606; G06F 9/4403; G06F 21/572; G06F 2221/033; G06F 8/61; G06F 21/53; G06F 21/57; H04L 9/3236

USPC ................................................ 713/1, 2, 100
See application file for complete search history.

(56) References Cited

U.S. PATENT DOCUMENTS 6,473,857 B1 10/2002 Panas et al.
7,260,555 B2 8/2007 Rossmann et al.
(Continued)

FOREIGN PATENT DOCUMENTS

EP 1 764 721 A2 3/2007
EP 3 422 661 A1 1/2019
(Continued)

OTHER PUBLICATIONS

Response to Non-Final Office Action filed Sep. 27, 2021 for U.S. Appl. No. 16/371,191; 11 Pages.
(Continued)

*Primary Examiner* — Michael J Brown
(74) *Attorney, Agent, or Firm* — Daly Crowley Mofford & Durkee, LLP (57) ABSTRACT

Techniques are disclosed for assessment and verification of processor configuration and settings using System Management Mode (SMM) in conjunction with a hardware root of trust (HRoT). A method may include receiving custom boot codes from a security device, the custom boot codes configured to install a security module to process a periodic System Management Interrupt (SMI), configure the periodic SMI for initiation, and configure at least one configuration register for validation in response to execution of the security module. The method may also include responsive to initiation of the configured periodic SMI, validating, using the security device, the at least one configuration register.

20 Claims, 5 Drawing Sheets

(51) Int. Cl.
  *G06F 9/4401* (2018.01)
  *G06F 8/61* (2018.01)

(56) References Cited

U.S. PATENT DOCUMENTS

| | | | |
|---|---|---|---|
| 9,235,709 | B2 | 1/2016 | Kim et al. |
| 9,251,343 | B1 | 2/2016 | Vincent et al. |
| 9,319,380 | B2 | 4/2016 | Lukacs et al. |
| 9,509,587 | B1 | 11/2016 | Marquardt et al. |
| 9,600,291 | B1 | 3/2017 | Atsatt |
| 9,626,512 | B1 * | 4/2017 | Brandwine ........... G06F 21/575 |
| 10,027,717 | B2 | 7/2018 | Ben-Shalom et al. |
| 2004/0003262 | A1 | 1/2004 | England et al. |
| 2004/0177260 | A1 | 9/2004 | Gilfix et al. |
| 2005/0138409 | A1 | 6/2005 | Sheriff et al. |
| 2006/0015748 | A1 | 1/2006 | Goto et al. |
| 2006/0026417 | A1 | 2/2006 | Furusawa et al. |
| 2008/0307488 | A1 | 12/2008 | Hammond, II et al. |
| 2009/0204964 | A1 | 8/2009 | Foley et al. |
| 2010/0070743 | A1 | 3/2010 | Grigor et al. |
| 2010/0250796 | A1 | 9/2010 | Jevans et al. |
| 2011/0302638 | A1 | 12/2011 | Cha et al. |
| 2014/0068275 | A1 | 3/2014 | Swanson et al. |
| 2014/0298026 | A1 | 10/2014 | Isozaki et al. |
| 2015/0012737 | A1 | 1/2015 | Newell |
| 2016/0125187 | A1 | 5/2016 | Oxford |
| 2016/0147996 | A1 | 5/2016 | Martinez |
| 2016/0162669 | A1 | 6/2016 | Mikhailov et al. |
| 2016/0378996 | A1 | 12/2016 | Smith et al. |
| 2017/0104770 | A1 | 4/2017 | Jreij et al. |
| 2017/0132417 | A1 | 5/2017 | Martinez |
| 2017/0180318 | A1 | 6/2017 | Lutas et al. |
| 2017/0213053 | A1 | 7/2017 | Areno et al. |
| 2017/0364685 | A1 | 12/2017 | Shah et al. |
| 2018/0034793 | A1 | 2/2018 | Kibalo et al. |
| 2018/0089425 | A1 | 3/2018 | Trikalinou |
| 2018/0165448 | A1 | 6/2018 | Nightingale et al. |
| 2018/0255077 | A1 | 9/2018 | Paine |
| 2018/0260009 | A1 | 9/2018 | Roeder |
| 2018/0278418 | A1 | 9/2018 | Chang et al. |
| 2018/0365425 | A1 | 12/2018 | Packer Ali et al. |
| 2019/0042516 | A1 | 2/2019 | Browning et al. |
| 2019/0050604 | A1 | 2/2019 | Weber et al. |
| 2019/0073478 | A1 | 3/2019 | Khessib et al. |
| 2019/0266331 | A1 | 8/2019 | Sanchez Diaz et al. |
| 2021/0034733 | A1 | 2/2021 | Grobelny et al. |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

Response to Non-Final Office Action filed Sep. 29, 2021 for U.S. Appl. No. 16/255,917; 8 Pages.
International Preliminary Report on Patentability dated Oct. 14, 2021 for PCT Application No. PCT/US2020/025195; 7 Pages.
International Preliminary Report on Patentability dated Oct. 14, 2021 for PCT Application No. PCT/US2020/025178; 7 Pages.
Notice of Allowance dated Nov. 12, 2021 for U.S. Appl. No. 16/255,917; 13 Pages.
U.S. Non-Final Office Action dated Jul. 2, 2021 for U.S. Appl. No. 16/255,917; 21 pages.
Response to U.S. Non-Final Office Action dated Apr. 29, 2021 for U.S. Appl. No. 16/398,641; Response filed on Jul. 23, 2021; 10 pages.
PCT International Search Report and Written Opinion dated Aug. 11, 2020 for International Application No. PCT/US2019/045607; 12 Pages.
U.S. Notice of Allowance dated Aug. 24, 2020 for U.S. Appl. No. 16/214,857; 7 Pages.
U.S. Non-Final Office Action dated Jun. 30, 2021 for U.S. Appl. No. 16/371,191; 16 pages.
Office Action dated Dec. 27, 2021 for U.S. Appl. No. 16/371,191; 17 Pages.
U.S. Appl. No. 16/832,192, filed Mar. 27, 2020, Staab.
U.S. Appl. No. 16/832,216, filed Mar. 27, 2020, Staab et al.
PCT International Preliminary Report dated Mar. 18, 2021 for International Application No. PCT/US2019/045607; 7 pages.
PCT International Preliminary Report dated Mar. 18, 2021 for International Application No. PCT/US2019/045610; 7 pages.
PCT International Preliminary Report dated Mar. 18, 2021 for International Application No. PCT/US2019/045608; 11 pages.
Non-Final Office Action dated Apr. 29, 2021 for U.S. Appl. No. 16/398,641; 38 Pages.
Response to U.S. Non-Final Office Action dated Dec. 3, 2020 for U.S. Appl. No. 16/371,191; Response filed on Feb. 23, 2021; 8 pages.
U.S. Final Office Action dated Mar. 16, 2021 for U.S. Appl. No. 16/371,191;16 pages.
U.S. Non-Final Office Action dated Jan. 26, 2021 for U.S. Appl. No. 16/255,917; 26 pages.
U.S. Non-Final Office Action dated Dec. 3, 2020 for U.S. Appl. No. 16/371,191; 18 Pages.
PCT International Preliminary Report dated Oct. 22, 2020 for International Application No. PCT/US2019/022879; 9 Pages.
Response to U.S. Final Office Action dated Mar. 16, 2021 for U.S. Appl. No. 16/371,191; Response filed on Jun. 15, 2021; 11 pages.
Response to U.S. Non-Final Office Action dated Jan. 26, 2021 for U.S. Appl. No. 16/255,917; Response filed on Mar. 23, 2021; 7 pages.
U.S. Non-Final Office Action dated May 14, 2020 for U.S. Appl. No. 16/214,857; 23 Pages.
PCT International Search Report and Written Opinion dated Jun. 26, 2020 for International Application No. PCT/US2019/045608; 16 Pages.
PCT International Search Report and Written Opinion dated Jun. 25, 2020 for International Application No. PCT/US2020/025178; 12 Pages.
PCT International Search Report and Written Opinion dated Jul. 13, 2020 for International Application No. PCT/US2020/025195; 12 Pages.
PCT International Search Report and Written Opinion dated Jul. 14, 2020 for International Application No. PCT/US2019/045610; 12 Pages.
Response to U.S. Non-Final Office Action dated May 14, 2020 for U.S. Appl. No. 16/214,857; Response Filed Jul. 30, 2020; 7 Pages.
U.S. Appl. No. 16/214,857, filed Dec. 10, 2018, Areno, et al.
U.S. Appl. No. 16/255,917, filed Jan. 24, 2019, Areno, et al.
U.S. Appl. No. 16/371,191, filed Apr. 1, 2019, Areno, et al.
U.S. Appl. No. 16/398,641, filed Apr. 30, 2019, Areno, et al.,
Cooper, et al., "BIOS Protection Guidelines," *National Institute of Standards and Technology*—Special Publication 800-147; U.S. Department of Commerce; Apr. 2011; 26 Pages.
Lohrke, et al., "No. Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.
Regenscheid, et al., "BIOS Integrity Measurement Guidelines (Draft);" *National Institute of Standards and Technology*—Special Publication 800-155; U.S. Department of Commerce; Dec. 2011; 47 Pages.
Regenscheid, "BIOS Protection Guidelines for Servers;" *National Institute of Standards and Technology*—NIST Special Publication 800-147B; U.S. Department of Commerce; Aug. 2014; 32 Pages.
Trusted Computing Group, "Trusted Platform Module Library, Part 1: Architecture;" Family "2.0", Level 00, Revision 01.16; TCG Published; Oct. 30, 2014; Part 1 of 2; 147 Pages.
Trusted Computing Group, "Trusted Platform Module Library, Part 1: Architecture;" Family "2.0", Level 00, Revision 01.16; TCG Published; Oct. 30, 2014; Part 2 of 2; 121 Pages.
Wilkins, et al., "UEFI Secure Boot in Modern Computer Security Solutions;" www.UEFI.org; Sep. 2013; 10 Pages.

(56) References Cited

OTHER PUBLICATIONS

PCT International Search Report and Written Opinion dated May 31, 2019 for International Application No. PCT/US2019/022879; 16 Pages.

* cited by examiner

SYSTEM VALIDATION BY HARDWARE ROOT OF TRUST (HROT) DEVICE AND SYSTEM MANAGEMENT MODE (SMM)

BACKGROUND

Computing systems, such as personal computers, workstations, servers, tablets, smartphones, and other mobile devices, typically include a basic input/output system (BIOS) or Unified Extensible Firmware Interface (UEFI) as an interface between the computer hardware (e.g., processor, memory, chipsets, etc.) and a software operating system (OS). A boot process, sometimes referred to as bootstrap, is a multi-stage process that typically starts with loading and execution of a low-level hardware-based process (e.g., a boot loader) that allows a computing system to operate from an initially powered-down state. At each stage of this multi-stage boot process, a smaller, simpler program loads and executes a larger, more complex program of the next stage in a process of chain loading, until the OS is loaded into main memory.

Protection of firmware codes, such as the BIOS or UEFI, is necessary to establish a secure booting and executing environment. To this end, a hardware root of trust (HRoT) may provide a more secure platform environment for the booting of computing systems. However, during the handoff in code execution from a HRoT to a processor (e.g., a CPU), there is often a security gap between the execution of boot code and before the OS is running on the computing system. During a conventional boot process, and even after the OS is running, it may be difficult for the HRoT to provide the introspection necessary to ensure computing system security.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer-implemented method may include receiving custom boot codes from a security device, the custom boot codes configured to install a security module to process a periodic System Management Interrupt (SMI), configure the periodic SMI for initiation, and configure at least one configuration register for validation in response to execution of the security module. The computer-implemented method may also include, during execution of the configured periodic SMI, validating, using the security device, the at least one configuration register.

In one aspect, the security device includes a hardware root of trust (HRoT) device.

In one aspect, the custom boot codes are received by a host processor via a secure channel.

In one aspect, the security module may be installed to execute in System Management Mode (SMM).

In one aspect, the at least one configuration register includes a dynamic random-access memory (DRAM) timing register.

In one aspect, the at least one configuration register includes a System Management Bus (SMBUS) control register.

In one aspect, validating the at least one configuration register may include hashing a value of the at least one configuration register and sending a hash of the value of the at least one configuration register to the security device for validation.

In one aspect, the method may also include, responsive to receiving the hash of the value of the at least one configuration register, determining a state of the at least one configuration register based on the received hash.

In one aspect, the hash is sent via a secure channel.

In one aspect, the custom boot codes are included in a basic input/output system (BIOS) or a Unified Extensible Firmware Interface (UEFI).

In one aspect, the method may also include initiating the configured periodic SMI during a boot process of a processor.

In one aspect, the method may also include initiating execution of the configured periodic SMI post system boot of a processor.

According to another illustrative embodiment provided to illustrate the broader concepts described herein, a secure system includes a hardware root of trust (HRoT) device comprising at least one processor and a host platform comprising at least one processor. The at least one processor of the HRoT device is configured to authenticate custom boot codes, the custom boot codes comprising a security module. The custom boot codes are configured to be loaded and executed on a host platform to, on the host platform, install the security module to process a periodic System Management Interrupt (SMI), configure the periodic SMI for initiation, and configure at least one configuration register for validation in response to execution of the security module, such that in response to initiation of the configured periodic SMI, the security module executes to validate the at least one configuration register using the HRoT device.

In one aspect, the HRoT device is further configured to provide the custom boot codes to the host platform via a secure channel.

In one aspect, the at least one processor of the HRoT device is configured to decrypt the custom boot codes.

In one aspect, the at least one configuration register includes a DRAM timing register or an SMBUS control register.

In one aspect, to install the security module includes to install the security module to execute in System Management Mode (SMM).

In one aspect, to validate the at least one configuration register comprises to send a hash of a value of the at least one configuration register to the HRoT device for validation.

In one aspect, the at least one processor of the HRoT device is further configured to, responsive to receiving the hash, validate the received hash.

According to another illustrative embodiment provided to illustrate the broader concepts described herein, a computer-implemented method may include loading, by a hardware root of trust (HRoT) device, custom boot codes, the custom boot codes comprising a security module, and authenticating, by the HRoT device, the custom boot codes. The method may also include providing the authenticated custom boot codes to a host platform such that, when executed by a processor of the host platform, the custom boot codes install the security module to execute in System Management Mode (SMM) to process a periodic System Management Interrupt (SMI), configure the periodic SMI for initiation, and configure at least one configuration register for validation using the HRoT device in response to execution of the security module.

These and other features of the present embodiments will be understood better by reading the following detailed description, taken together with the figures herein described.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

In accordance with the various embodiments of the present disclosure, techniques are disclosed for assessment and verification of processor configuration and settings using System Management Mode (SMM) in conjunction with a hardware root of trust (HRoT). In an embodiment, a periodic System Management Interrupt (SMI) is scheduled and initiated to assist the HRoT in system validation during a secure system boot process and/or during runtime (e.g., post system boot). When the periodic SMI is initiated (or triggered), a custom security module that executes in SMM causes the configured configuration registers to be validated by the HRoT. For example, in an implementation, the custom security module is programmed or otherwise configured to read the values of the configured configuration registers, hash the read values, and send or otherwise provide the hash values (or more simply "hashes" or "hash" in the singular) to the HRoT for verification. The hashes may be sent to the HRoT via a secure communication channel, and the HRoT may compare the hashes to expected values. Executing the custom security module in SMM ensures execution of the custom security module. In other words, since the custom security module is included in and executed as part of SMM, a bad actor is not able to prevent the custom security module from validating the state of the processor. Also, a bad actor is not able to spoof the location and/or value of the processor registers since code executing in SMM is able to locate and access the processor register bank. These and other advantages, variations, and embodiments will be apparent in light of this disclosure.

As used herein, the term "Root of Trust (RoT)" refers broadly, in addition to its plain and ordinary meaning, to a trusted computing module that provides a set of functions that are trusted by other modules in a computing environment, such as an Operating System (OS). The RoT may serve as an independent computing module providing authenticity in a computer or mobile device in which it is embedded. The term "hardware root of trust (HRoT)" device refers to or otherwise describes a hardware device that provides RoT functions. The HRoT device generally provides, but not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state.

Figure 1:
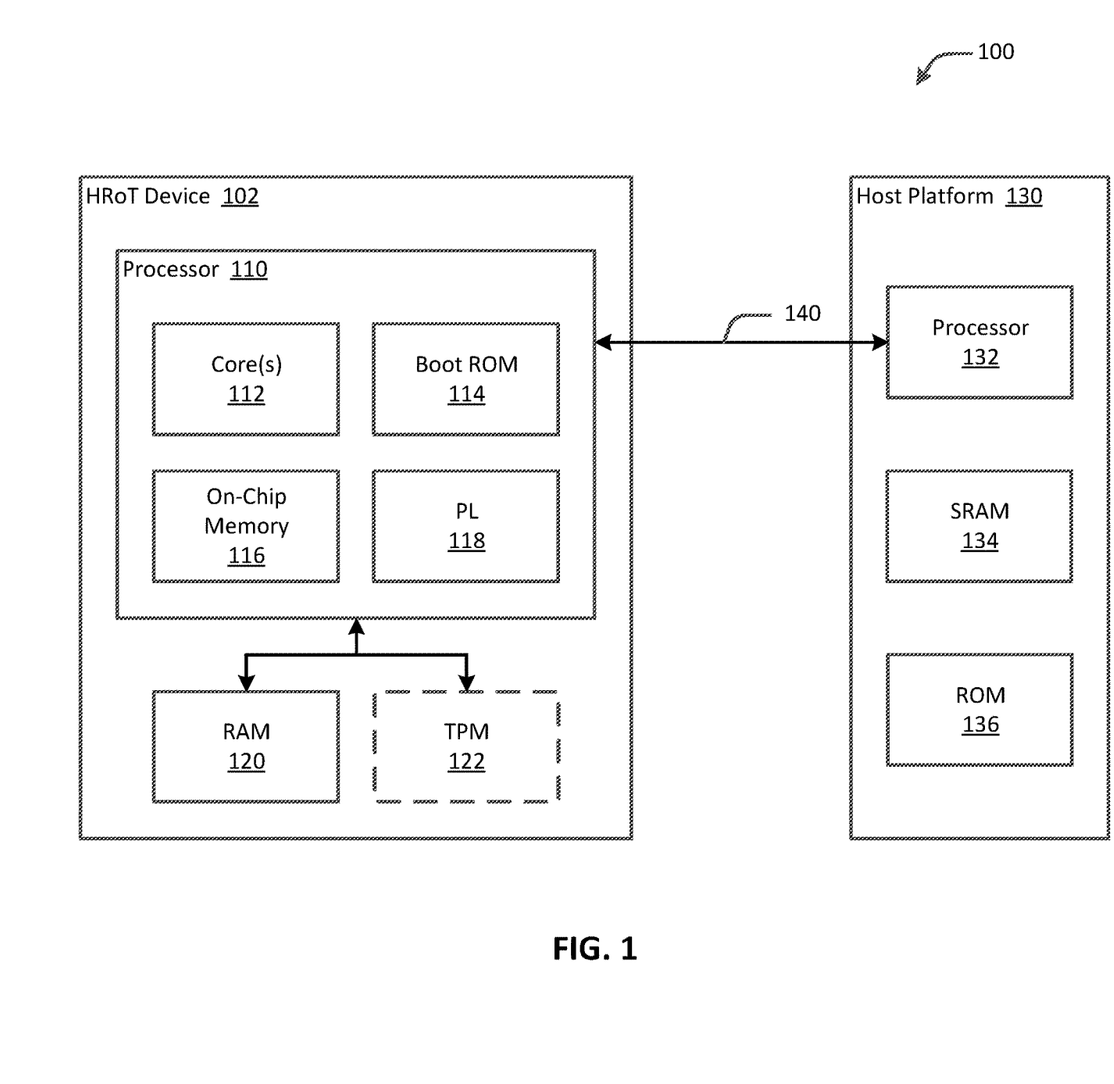
FIG. 1 is a block diagram illustrating selective components of an example secure system including a hardware root of trust (HRoT) device and a host platform, in accordance with an embodiment of the present disclosure.

Referring to the figures, FIG. 1 is a block diagram illustrating selective components of an example secure system 100 including a hardware root of trust (HRoT) device 102 and a host platform 130, in accordance with an embodiment of the present disclosure. HRoT device 102 may comprise a security device that provides a set of functions that are trusted by other modules of a computing environment, such as, for example, host platform 130. HRoT device 102 and host platform 130 may be respective independent systems with similar or different setups. Each of the systems (e.g., HRoT device 102 and host platform 130) may have its own processor, memory and other interfaces. In some embodiments, host platform 130 may be a Commercial Off-the-Shelf (COTS) device that supports a secure boot sequence. As shown, HRoT device 102 may include a multi-core processor 110, a memory 120, and an optional Trusted Platform Module (TPM) 122. Host platform 130 may include a processor (e.g., a central processing unit (CPU)) 132, a static random access memory (SRAM) 134, and a read-only memory (ROM) 136.

As can be seen in FIG. 1, processor 110 of HRoT device 102 may include one or more cores 112, a boot read-only memory (Boot ROM) 114, an on-chip memory 116, and programmable logic (PL) 118. Processor 110 of HRoT device 102 generally requires higher security features than a conventional processor being used in a system that does not require higher security. In some embodiments, processor 110 may be a normal microprocessor or field-programmable gate array (FPGA). In cases where processor 110 comprises a FPGA, PL 118 may be part of or otherwise included in processor 110. In some embodiments, HRoT device 102 may comprise a substantially similar architecture as that of host platform 130.

Boot ROM 114 can be a place that HRoT device 102 loads and executes secure boot code that initializes a secure booting procedure of HRoT device 102. On-chip memory 116 may perform as storage for boot loader codes that are loaded and executed by the secure boot code. On-chip memory 116 may be volatile and maintain an operating system (OS) and other application(s) for operation of processor 110. PL 118 may perform as a storage for a security monitoring application that is loaded and executed by the boot loader codes. As can be appreciated by those of ordinary skill in the pertinent art, processor 110 may have more or lesser number of on-chip and off-chip storages than what is described in conjunction with FIG. 1. It should also be appreciated that the structure of processor 132 in host platform 130 may have a similar structure with processor 110 in HRoT device 102. In another embodiment, the secure boot code and boot loader codes may be loaded and executed in the same on-chip or off-chip memory, for example BIOS flash in an INTEL processor. In addition, the security monitoring application may be loaded and executed in the same memory or storage where the boot codes are loaded.

In some embodiments, HRoT device 102 may include optional TPM 122. In such embodiments, processor 110 may bind to TPM 122 inside of HRoT device 102 by using a suitable binding procedure. TPM 122 is a specialized device for hardware authentication, which may include a dedicated microcontroller that provides one or more of secure storage, key generation, and cryptographic operations, for example.

In some embodiments, a secure booting process of secure system 100 may start with a secure booting of HRoT device 102. In an implementation, once cores 112 are powered on, cores 112 may begin executing secure boot code from internal boot ROM 114. Note that only one core among cores 112 executes the entire boot code, while the other remaining cores remain in a holding pattern or loop waiting to be initialized by the executing core (i.e., the core that is executing the boot code). At this stage of the booting process, PL area 118 is not used or initialized.

Once the secure boot codes are loaded and executed, the secure boot codes may validate Unified Extensible Firmware Interface (UEFI) codes that are not authenticated. As is further described below at least in conjunction with FIG. 2, processor 132 of host platform 130 may execute the validated UEFI codes, for example, during its boot process. In some implementations, the secure boot codes may load and execute the UEFI codes in HRoT device 102. When HRoT device 102 boots with the UEFI codes, HRoT device 102 may load optional drivers to support initial communications with connected devices. The UEFI code then may validate a boot loader, which may be loaded and executed once the boot loader is validated.

HRoT device 102 may then load and execute the boot loader from on-chip memory 116. In some embodiments, the boot loader may be encrypted. In such embodiments, the boot loader may be decrypted and authenticated prior to execution to ensure that the boot loader code and on-chip memory 116 that contains the boot loader are not tampered with. It will be appreciated in light of this disclosure that the boot loader may be loaded and executed in other memory, as can be appreciated by those of ordinary skill in the pertinent art.

HRoT device 102 may load and execute a security monitoring application. In an implementation, the security monitoring application may be loaded and executed in PL area 118. The purpose of executing the security monitoring application is to provide a "tamper detection mechanism" by intercepting events of the system. The security monitoring application may also monitor inputs and outputs to/from the system. Before proceeding to a next stage booting process, the security monitoring application may validate the current state of HRoT device 102 (e.g., the hardware components of HRoT device 102) to ensure that HRoT device 102 has not been tampered with.

Once HRoT device 102 is validated, HRoT device 102 authenticates and decrypts custom boot codes, which may be securely loaded on host platform 130. In an embodiment, the custom boot codes, when loaded and executed on host platform 130, installs a custom security module that may be executed to handle or service periodic System Management Interrupts (SMIs). In this sense, the custom security module may serve or operate as the SMI handler. The custom boot codes also configure one or more configuration registers for monitoring, and configure and lock a periodic SMI such that, when the periodic SMI is triggered, the custom security module executes to cause the configured configuration register values to be validated. As used herein, the term "configuration registers" (or "configuration register" in the singular) refers broadly to registers, including hardware registers, whose values may be indicative of the stability of the system. Non-limiting examples of such configuration registers include, dynamic random-access memory (DRAM) timing registers, Row Hammer mitigation configuration, System Management Bus (SMBUS) control registers, and DRAM serial presence detect (SPD) writeable regions.

The encrypted custom boot codes may be retrieved from on-chip (e.g., internal) or off-chip (e.g., external) memory, such as, for example, flash memory. In an example use case, a user may generate custom boot codes, encrypt the custom boot codes, sign the encrypted custom boot codes, and then provide the encrypted custom boot codes on the flash memory. HRoT device 102 can then authenticate and decrypt the encrypted custom boot codes and, if authenticated, write or otherwise provide the decrypted custom boot codes to host platform 130 for securely loading on processor 132.

In some embodiments, processors 110 and 132 and related components may be connected or otherwise communicatively coupled through an interconnect interface 140, which may be configured to provide a secure communication channel. Interconnect interface 140 may be a peripheral component interconnect (PCI) express (PCIe) interface, a serial peripheral interface (SPI), a low pin count (LPC) interface, or any other suitable interconnect interface. In some embodiments, HRoT device 102 may utilize interconnect interface 140 to extend or otherwise provide trust to processor 132. In some embodiments, a custom FPGA bitstream can be loaded from an external device through Direct Memory Access (DMA) transactions supported by interconnect interface 140. For example, DMA transactions may allow HRoT device 102 directly access programmable elements, such as memory or Field Programmable Gate Arrays (FPGA), of processor 132 of host platform 130. In some embodiments, the access of such programmable elements (e.g., uploading of custom codes or bitstreams) may be enhanced by a Physically Unclonable Function (PUF). Accordingly, as will be further described below, it may be possible to securely load custom boot codes into memory of processor 132 that can expand the level of introspection, control, and system validation available for processor 132.

When host platform 130 is first booted, host platform 130 may initially load initial firmware from a storage medium, such as SRAM 134 or ROM 136, for example. In some embodiments, the initial firmware may be stored in and loaded from a shared memory located on host platform 130 or BIOS flash device (not shown). Herein, the initial firmware may be a custom firmware, which can be loaded into the internal SRAM (e.g., SRAM 140 of FIG. 1) of host platform 130 during the boot sequence. In an implementation, when executed, the custom firmware may access interconnect interface 140 to establish a secure communication channel between processor 132 and HRoT device 102. In some embodiments, host platform 130 and HRoT device 102 may perform an authorization procedure before establishing the secure communication channel.

Once the secure communication channel is established between processor 132 and HRoT device 102, the custom firmware of host platform 130 may receive the authenticated custom boot codes (e.g., included in or as part of a BIOS or a UEFI) from HRoT device 102 over the secure communication channel.

Figure 2:
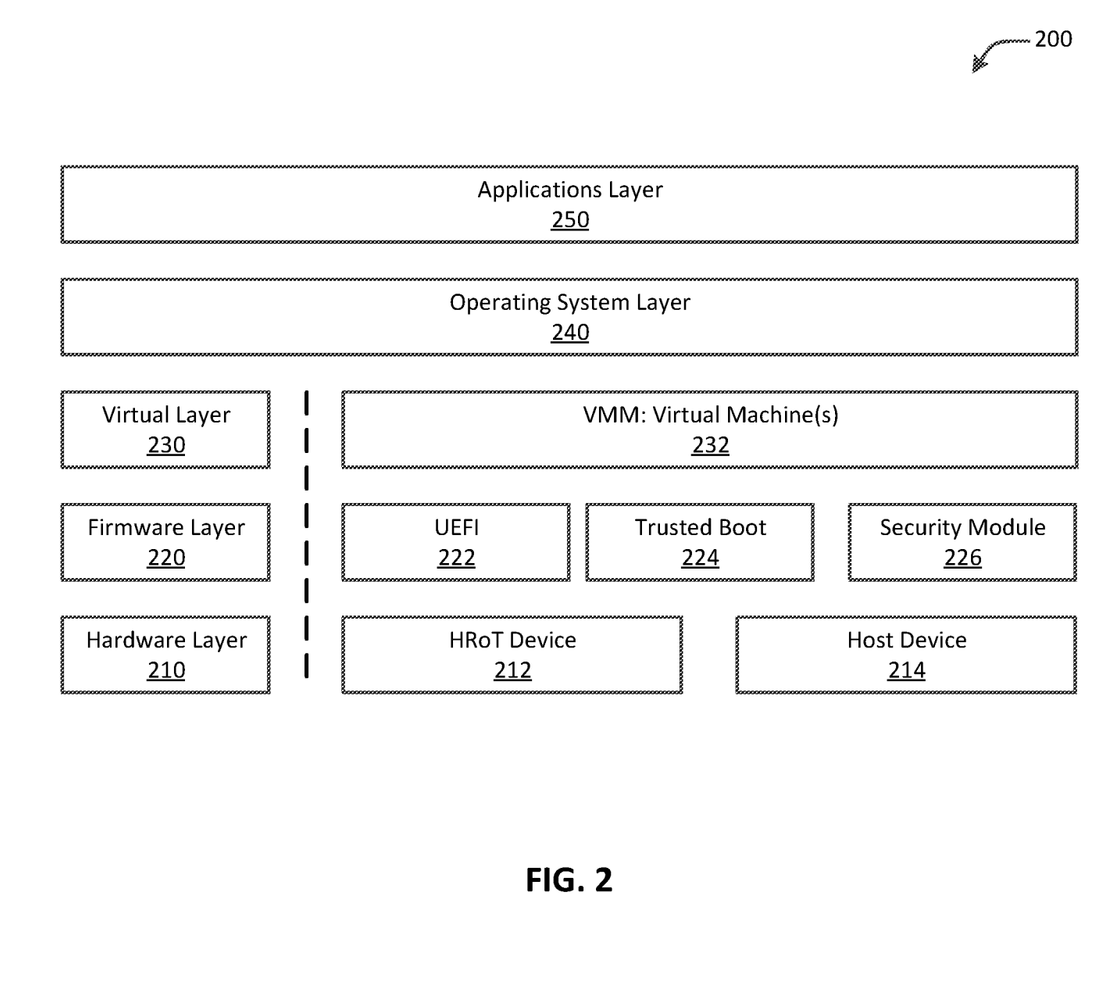
FIG. 2 is a block diagram illustrating an example architecture of a secure system, such as the secure system of FIG. 1, in accordance with an embodiment of the present disclosure.

FIG. 2 is a block diagram illustrating an example architecture 200 of a secure system, such as secure system 100 of FIG. 1, in accordance with an embodiment of the present disclosure. As shown, architecture 200 may have a number of layers including a hardware layer 210, a firmware layer 220, a virtual layer 230, an operating system (OS) 240, and applications 250. Hardware layer 210 of architecture 200 may include an HRoT device 212 and a host device 214. HRoT device 212 and host device 214 may be substantially similar to HRoT device 102 and host platform 130, respectively, described above in conjunction with FIG. 1. Herein, a processor of host device 214 supports the secure boot sequence using the custom boot codes received from or otherwise provided by HRoT device 212, as described above in conjunction with FIG. 1.

Firmware layer 220 includes a Unified Extensible Firmware Interface (UEFI) code 222, trusted boot code 224, and a security module 226. Here, UEFI code 222 and trusted boot code 224 are shown as separate, but during execution, UEFI code 222 and trusted boot code 224 may be included in a single booting process. In some embodiments, UEFI code 222 may be stored on a flash device. Security module 226 may perform system validation by monitoring the validity of one or more configured configuration registers. For example, in an implementation, security module 226 may include the custom security module. UEFI code 222 is a boot code based upon UEFI specification. The UEFI specification supports advanced boot options and utilizes 64-bit address ranges. The UEFI also supports a Secure Boot mechanism. The Secure Boot mechanism also may provide a way to authenticate codes that are involved with a system startup. The first code executed in a boot sequence on most computer systems is usually stored in some form of programmable read-only memory, such as Boot ROM 114 of FIG. 1. This code is responsible for identifying the location of the UEFI codes, authenticating the UEFI codes, and loading the UEFI codes into memory. For example, a host processor (e.g., processor 132 of FIG. 1) may load and execute secure boot codes that initializes a secure booting procedure of host platform 130 (e.g., a Boot ROM in processor 132). Then the secure boot codes may load and execute the UEFI codes. Once loaded, the UEFI codes can bring in additional code pieces in the form of drivers, option ROMs, and additional applications, which might be necessary for the continuation of the boot process. In embodiments, a required element that the UEFI finds is the boot loader responsible for loading the OS. The boot loader, once found, is authenticated, loaded, and begins execution. This boot loader will then authenticate and load the OS kernel, which will load the other codes necessary for its functionality. In some embodiments, the drivers and applications for the OS may not go through authentication as part of the secure boot process. It will be appreciated in light of this disclosure that the Secure Boot mechanism need not be implemented.

Virtual layer 230 may include one or more virtual machines 232. Virtualization technology provides the capability to support concurrent execution of multiple operating system environments. A controlling module or software that handles virtual machines is called a Virtual Machine Monitor (VMM) or a Hypervisor. The VMM is similar to the kernel process for standard Operating Systems, including hardware support. The VMM is responsible for presenting the virtual hardware interface to execution environments, handling scheduling of system resources between environments, and allocating required resources as needed by each environment. In some embodiments, virtual layer 230 may not be used, and HRoT device 102 may load an operating system, such as OS 240, on top of hardware layer 210 and firmware layer 220. The operating system may comprise a COTS operating system, such as Microsoft Windows®, Linux®, macOS®, or any other suitable operating system. After a particular operating system is loaded, one or more applications 250 may be loaded an executed.

Figure 3:
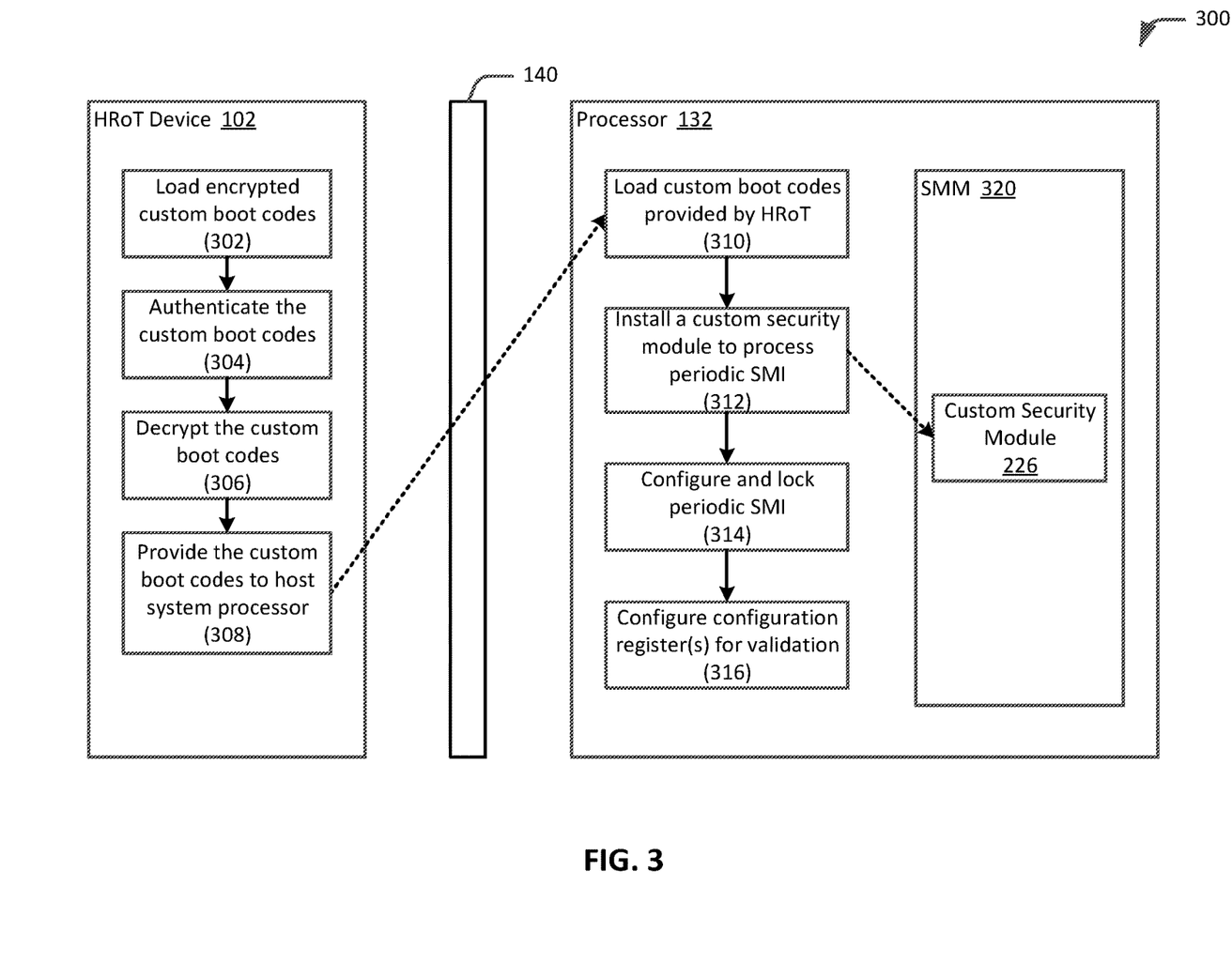
FIG. 3 is a flow diagram illustrating an example process for installing a security module to process a periodic System Management Interrupt (SMI), in accordance with an embodiment of the present disclosure.

FIG. 3 is a flow diagram illustrating an example process 300 for installing a custom security module to process a periodic System Management Interrupt (SMI), in accordance with an embodiment of the present disclosure. For example, as can be seen, a security device, such as HRoT device 102, may send or otherwise provide to a processor of a host system, such as processor 132 of host platform 130, custom boot codes that include the custom security module. The custom boot codes can then be executed to install the custom security module, configure one or more configuration registers for validation, and configure a periodic SMI.

With reference to process 300, at 302, HRoT device 102 may load encrypted custom boot codes. For example, the encrypted custom boot codes may be loaded on internal or local memory such as, for example, RAM 120 or on-chip memory 116. In an embodiment, the encrypted custom boot codes may be loaded from an external memory device such as, for example, an external flash device.

At 304, HRoT device 102 may authenticate the encrypted custom boot codes. For example, the encrypted custom boot codes may have been digitally signed, for example, using a key, such as a private key. In such cases, HRoT device 102 may authenticate the digitally signed encrypted custom boot codes by, for example, verifying the digital signature. At 306, HRoT device 102 may decrypt the encrypted custom boot codes into cleartext (i.e., unencrypted custom boot codes or more simply "custom boot codes"). For example, the encrypted custom boot codes may be decrypted using an appropriate decryption key.

At 308, HRoT device 102 may send the authenticated and decrypted custom boot codes to processor 132 of host platform 130. For example, HRoT device 102 may send the custom boot codes via interconnect interface 140, which provides a secure communication channel to processor 132 of host platform 130. The concepts of a hardware root of trust is well understood in the fields of computing system security and will not be discussed in detail here. However, for purposes of this discussion, it is sufficient to understand that HRoT device 102 operates to provide validated codes, such as the custom boot codes, from an immutable source.

At 310, processor 132 may load the custom boot codes provided by HRoT device 102. For example, the custom boot codes may be loaded on secure memory, such as, for example, SRAM 134. Once loaded, processor 132 may execute or otherwise cause execution of the custom boot codes. The custom boot codes may be executed as part of a secure boot process of processor 132.

At 312, the custom boot codes may install the custom security module (e.g., custom security module 226 of FIG. 2). In an embodiment, as can be seen in FIG. 3, custom security module 226 may be installed as part of SMM 320 to process periodic SMIs. At 314, the custom boot codes may configure and lock a periodic SMI. For example, the periodic SMI may be configured to trigger (be initiated) every 60 seconds (secs.), 70 secs, 80 secs, 90 secs, 120 secs, 180 secs, or any other suitable time. Note that the trigger time value determines the frequency or rate at which introspection is provided to verify the security of host platform 130.

At 316, the custom boot codes may configure one or more configuration registers. The configured configuration registers are the registers whose respective values are validated by the HRoT device 102 when the periodic SMI is triggered (initiated). For example, when a periodic SMI is triggered, processor 132 may enter SMM 320 and cause execution of custom security module 226, which causes the respective values of the configured configuration registers to be validated. Note that the trigger time value and the particular security hardware configuration registers that are configured are specified by the custom boot code. That is, the creator of the custom boot code (e.g., a user who generated the custom boot codes) may specify a desired trigger time value and the security hardware configuration registers that are to be configured. Upon configuration of the specified configuration registers, processor 132 may continue its boot process.

Figure 4:
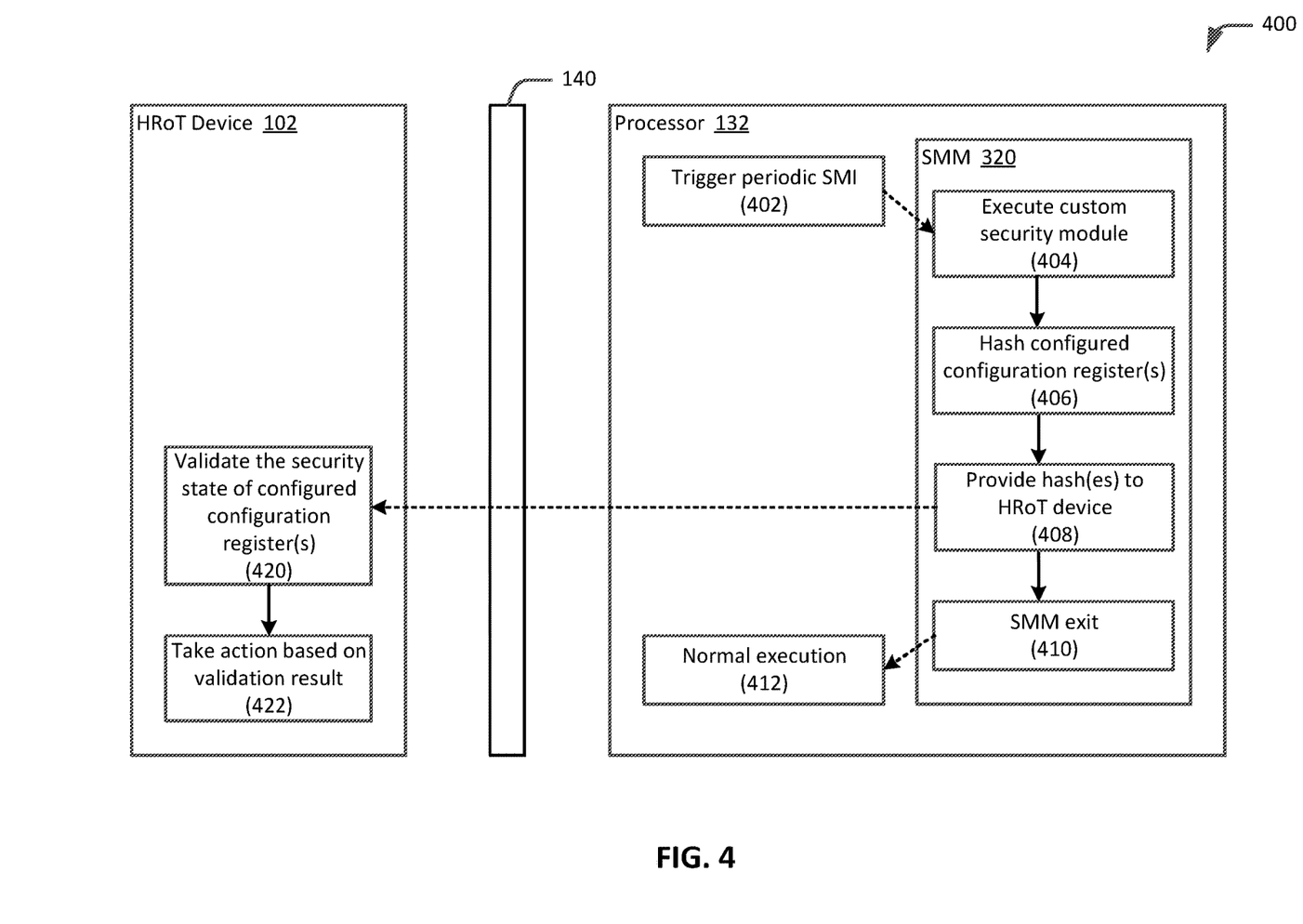
FIG. 4 is a flow diagram illustrating an example process for processing a periodic System Management Interrupt (SMI) to validate configuration registers, in accordance with an embodiment of the present disclosure.

FIG. 4 is a flow diagram illustrating an example process 400 for processing a periodic System Management Interrupt (SMI) to validate configuration registers, in accordance with an embodiment of the present disclosure. The periodic SMI is triggered according to the configured trigger time value upon being configured by the custom boot code. This allows for validation of the values of the configured configuration registers during the boot process (i.e., upon configuration of the periodic SMI) and during runtime. With reference to process 400, at 402, processor 132 may trigger a periodic SMI.

At 404, custom security module 226 may execute in SMM 320 to handle the triggered periodic SMI. For example, processor 132 may enter SMM 320 and cause execution of custom security module 226 to handle the triggered periodic SMI. At 406, custom security module 226 may hash the values of the configured configuration registers. At 408, custom security module 226 may provide the respective hashes of the configured configuration register values to HRoT device 102 for validation. For example, custom security module 226 may send the hashes to HRoT device 102 via interconnect interface 140, which provides a secure communication channel to HRoT device 102. At 410, SMM 320 may exit and, at 412, processor 132 may resume normal execution.

At 420, HRoT device 102 may validate security state of the configured configuration registers. For example, the security state of the configured configuration registers may be validated by comparing the hashes received from or otherwise provided by custom security module 226 to known good values. In an implementation, the known good values of the configuration registers (the known good hashes of the configuration registers) may be retrieved from secure memory, such as from an external flash accessible by HRoT device 102 or from secure location within HRoT device 102 (e.g., HRoT device 102 software/firmware). Note that the known good values may be the values HRoT 102 receives from the SMM code (e.g., SMM 320) during the provisioning of HRoT 102 to the host (e.g., host platform 130). This is based on a premise that the provisioning of HRoT 102 to the host is in a secure environment. Since the provisioning of HRoT 102 to the host is secure, HRoT 102 may consider the hash values it receives from the SMM code as valid and store the received values in secure memory. HRoT 102 may then use the stored values as the expected (known good values) values when later validating the security state of the configured configuration registers. In some embodiments, the stored hash values may be encrypted.

At 422, HRoT device may take appropriate action based on the results of the validation. For example, upon unsuccessful validation, HRoT device 102 may log a record of the unsuccessful validation, cause a power-down or shutdown of host platform 130, or cause any other suitable action. For example, if the hash that fails validation is of a hardware register associated with a security feature that is not critical to the operation of host platform 130, HRoT device may log a record of the failed validation. If the hash that fails validation is of a hardware register associated with a security feature that is critical to the operation of host platform 130, HRoT device may cause a power-down or shutdown of host platform 130. HRoT device 102 may cause any other suitable action based on the security feature that failed validation.

Figure 5:
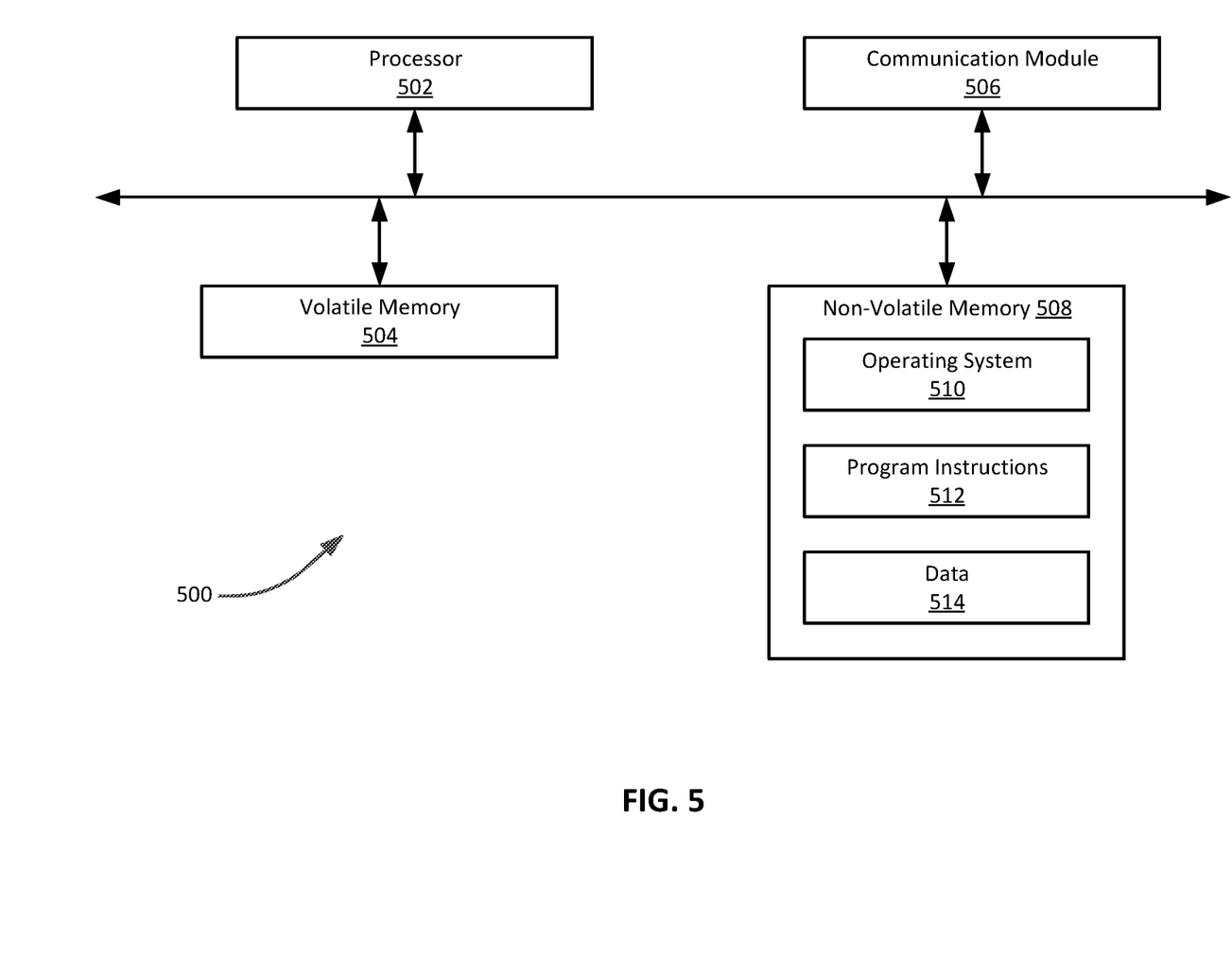
FIG. 5 is a block diagram illustrating selective components of an example computing device in which various aspects of the disclosure may be implemented, in accordance with an embodiment of the present disclosure.

FIG. 5 is a block diagram illustrating selective components of an example computing device 500 in which various aspects of the disclosure may be implemented, in accordance with an embodiment of the present disclosure. In some embodiments, computing device 500 may be configured to implement or direct one or more operations associated with some or all of the engines, components, and/or modules associated with system 100 of FIG. 1, including HRoT device 102 and/or host platform 130. For example, HRoT device 102, host platform 130, any components of HRoT device 102 and/or host platform 130, or any combination of these may be implemented in and/or using computing device 500. In one example case, for instance, each of the processes performed by HRoT device 102 and/or host platform 130 as described herein may be stored on a non-volatile memory 508 (e.g., a hard disk), loaded in a volatile memory 504 (e.g., random access memory (RAM)), and executable by a processor 502. However, the illustrated computing device 500 is shown merely as an example and one skilled in the art will appreciate that components of system 100 of FIG. 1, including HRoT device 102 and/or host platform 130, may be implemented by any computing or processing environment and with any type of machine or set of machines that may have suitable hardware and/or software capable of operating as described herein.

In some embodiments, computing device 500 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. In some embodiments, a distributed computational system may be provided comprising multiple of such computing devices. As shown in FIG. 5, computing device 500 includes processor 502, volatile memory 504, a communication module 506, and non-volatile memory 508, which includes an operating system 510, program instructions 512, and data 514. Processor 502, volatile memory 504, communication module 506, and non-volatile memory 508 may be communicatively coupled. In various embodiments, additional components (not illustrated, such as a display, communication module, input/output interface, etc.) or a subset of the illustrated components can be employed without deviating from the scope of the present disclosure.

Processor 502 may be designed to control the operations of the various other components of computing device 500. Processor 502 may include any processing unit suitable for use in computing device 500, such as a single core or multi-core processor. In general, processor 502 may include any suitable special-purpose or general-purpose computer, computing entity, or computing or processing device including various computer hardware, or firmware, and may be configured to execute instructions, such as program instructions, stored on any applicable computer-readable storage media. For example, processor 502 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi-core, or any other digital or analog circuitry configured to interpret and/or to execute program instructions and/or to process data, whether loaded from memory or implemented directly in hardware. Although illustrated as a single processor in FIG. 5, processor 502 may include any number of processors and/or processor cores configured to, individually or collectively, perform or direct performance of any number of operations described in the present disclosure.

For example, in some embodiments, any one or more of the engines, components and/or modules of system 100 may be included non-volatile memory 508 as program instructions 512. For example, in such embodiments, program instructions 512 cause computing device 500 to implement functionality in accordance with the various embodiments and/or examples described herein. Processor 502 may fetch some or all of program instructions 512 from non-volatile memory 508 and may load the fetched program instructions 512 in volatile memory 504. Subsequent to loading the fetched program instructions 512 into volatile memory 504, processor 502 may execute program instructions 512 such that the various embodiments and/or examples with respect to the system validation process, including processes 300 and 400, as variously described herein are performed.

In some embodiments, virtualization may be employed in computing device 500 so that infrastructure and resources in computing device 500 may be shared dynamically. For example, a VM may be provided to handle a process running on multiple processors so that the process appears to be using only one computing resource rather than multiple computing resources. Multiple VMs may also be used with one processor.

Volatile memory 504 may include computer-readable storage media configured for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Communication module 506 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 506 can also be configured to provide intra-device communications via a bus or an interconnect.

Non-volatile memory 508 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with volatile memory 504, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Computer-executable instructions may include, for example, instructions and data configured to cause processor 502 to perform a certain operation or group of operations. Non-volatile memory 508 may be provided on computing device 500 or provided separately or remotely from computing device 500.

Operating system 510 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with computing device 500, and therefore may also be implemented using any suitable existing or subsequently developed platform. Processor 502 may fetch some or all of computer instructions of operating system 510 from non-volatile memory 508 and may load the fetched computer instructions in volatile memory 504. Subsequent to loading the fetched computer instructions of operating system 510 into volatile memory 504, processor 502 may execute operating system 510.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method comprising:
receiving custom boot codes from a security device, the custom boot codes, when executed by a processor, configured to
install a security module to process a periodic System Management Interrupt (SMI);
configure the periodic SMI for initiation; and
configure at least one configuration register for validation in response to execution of the security module; and
responsive to initiation of the configured periodic SMI, validating, using the security device, the at least one configuration register.

2. The computer-implemented method of claim 1, wherein the security device includes a hardware root of trust (HRoT) device.

3. The computer-implemented method of claim 1, wherein the custom boot codes are received via a secure channel.

4. The computer-implemented method of claim 1, wherein to install the security module includes to install the security module to execute in System Management Mode (SMM).

5. The computer-implemented method of claim 1, wherein the at least one configuration register includes a dynamic random-access memory (DRAM) timing register.

6. The computer-implemented method of claim 1, wherein the at least one configuration register includes a System Management Bus (SMBUS) control register.

7. The computer-implemented method of claim 1, wherein validating the at least one configuration register comprises:
hashing a value of the at least one configuration register; and
sending a hash of the value of the at least one configuration register to the security device for validation.

8. The computer-implemented method of claim 7, further comprising, responsive to receiving the hash of the value of the at least one configuration register, determining a state of the at least one configuration register based on the received hash.

9. The computer-implemented method of claim 7, wherein the hash is sent via a secure channel.

10. The computer-implemented method of claim 1, wherein the custom boot codes are included in a basic input/output system (BIOS) or a Unified Extensible Firmware Interface (UEFI).

11. The computer-implemented method of claim 1, further comprising initiating the configured periodic SMI during a boot process of the processor.

12. The computer-implemented method of claim 1, further comprising initiating the configured periodic SMI post system boot of the processor.

13. A secure system comprising:
a hardware root of trust (HRoT) device comprising at least one processor, the at least one processor of the HRoT device configured to authenticate custom boot codes, the custom boot codes comprising a security module, the custom boot codes configured to be loaded and executed on a host platform, the customer boot codes, when executed by a processor on the host platform, being configured to:
install the security module to process a periodic System Management Interrupt (SMI);
configure the periodic SMI for initiation; and
configure at least one configuration register for validation in response to execution of the security module;

such that, in response to initiation of the configured periodic SMI, the security module executes to validate the at least one configuration register using the HRoT device.

14. The system of claim 13, the HRoT device is further configured to provide the custom boot codes to the host platform via a secure channel.

15. The system of claim 13, wherein the at least one processor of the HRoT device is configured to decrypt the custom boot codes.

16. The system of claim 13, wherein the at least one configuration register includes a dynamic random-access memory (DRAM) timing register or a System Management Bus (SMBUS) control register.

17. The system of claim 13, wherein to install the security module includes to install the security module to execute in System Management Mode (SMM).

18. The system of claim 13, wherein to validate the at least one configuration register comprises to send a hash of a value of the at least one configuration register to the HRoT device for validation.

19. The system of claim 18, wherein the at least one processor of the HRoT device is further configured to, responsive to receipt of the hash, validate the received hash.

20. A computer-implemented method comprising:
loading, by a hardware root of trust (HRoT) device, custom boot codes, the custom boot codes comprising a security module;
authenticating, by the HRoT device, the custom boot codes; and
providing the authenticated custom boot codes to a host platform such that, when executed by a processor of the host platform, the custom boot codes
install the security module to execute in System Management Mode (SMM) to process a periodic System Management Interrupt (SMI);
configure the periodic SMI for initiation; and
configure at least one configuration register for validation using the HRoT device in response to execution of the security module.

\* \* \* \* \*